Dec. 7, 1948.                E. V. BUNTING                2,455,727
            IMPLEMENT CONTROL MEANS FOR TRACTOR
               MOUNTED AGRICULTURAL IMPLEMENTS
Filed Nov. 23, 1944                          4 Sheets-Sheet 1
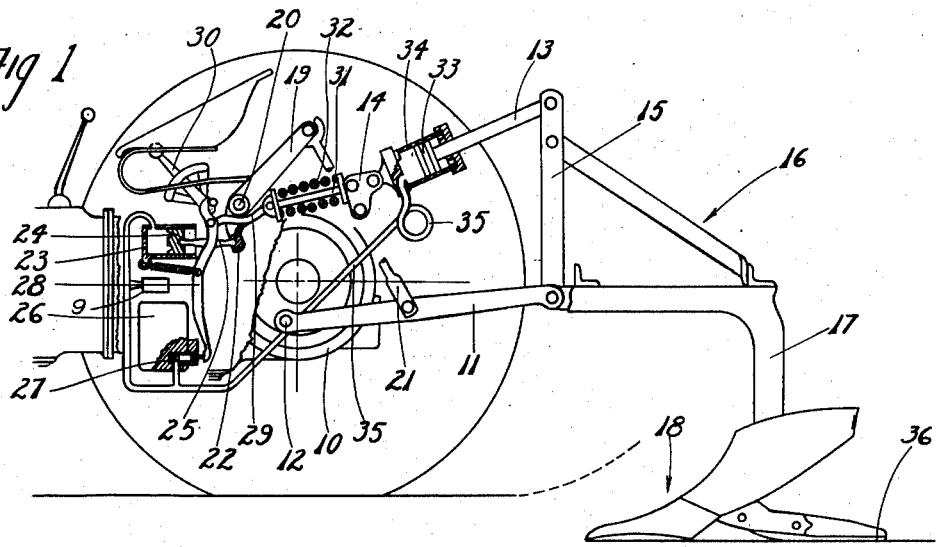
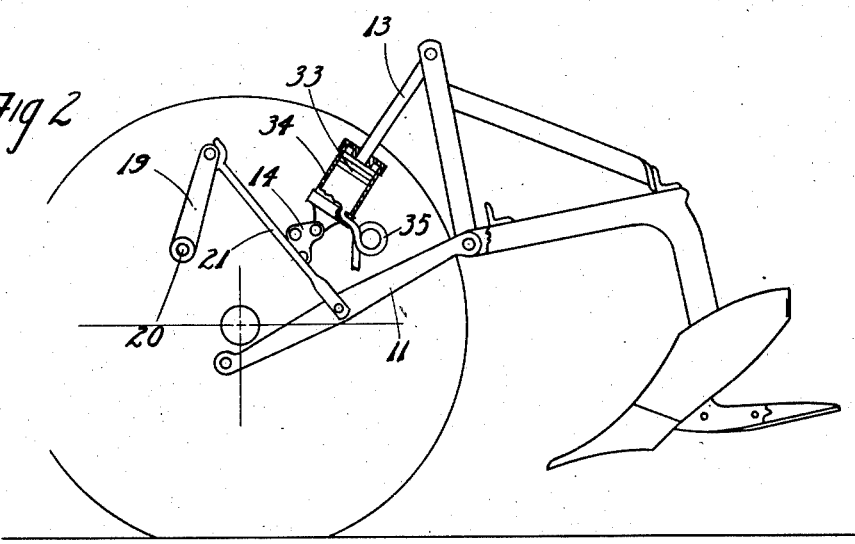
ERNEST V. BUNTING
INVENTOR.
BY Dec. 7, 1948.  E. V. BUNTING  2,455,727
IMPLEMENT CONTROL MEANS FOR TRACTOR
MOUNTED AGRICULTURAL IMPLEMENTS
Filed Nov. 23, 1944  4 Sheets-Sheet 2
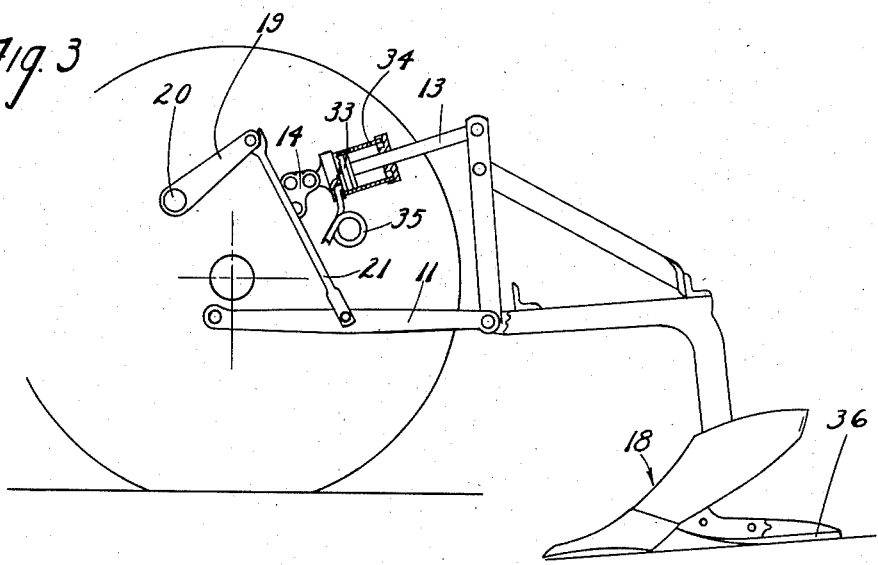
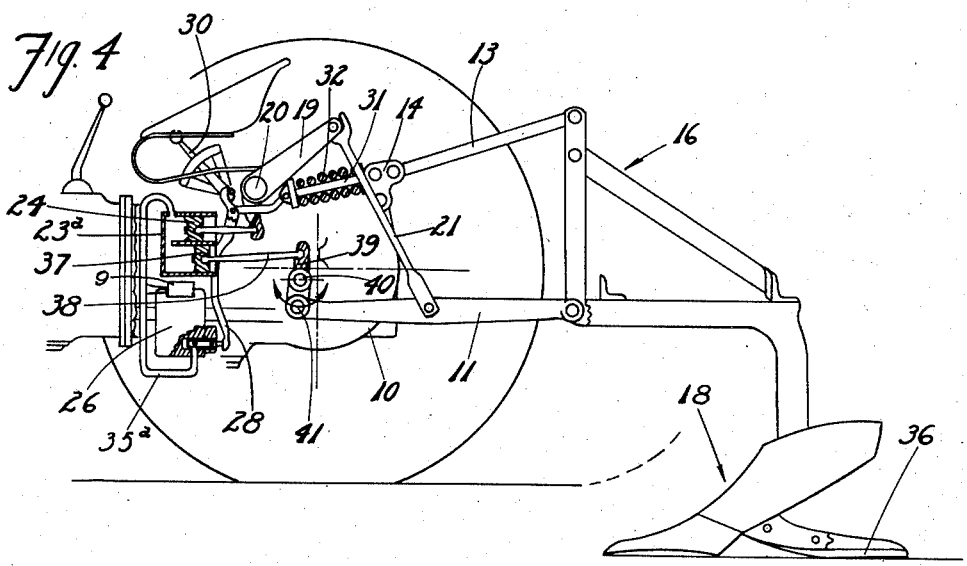
ERNEST V. BUNTING
INVENTOR.

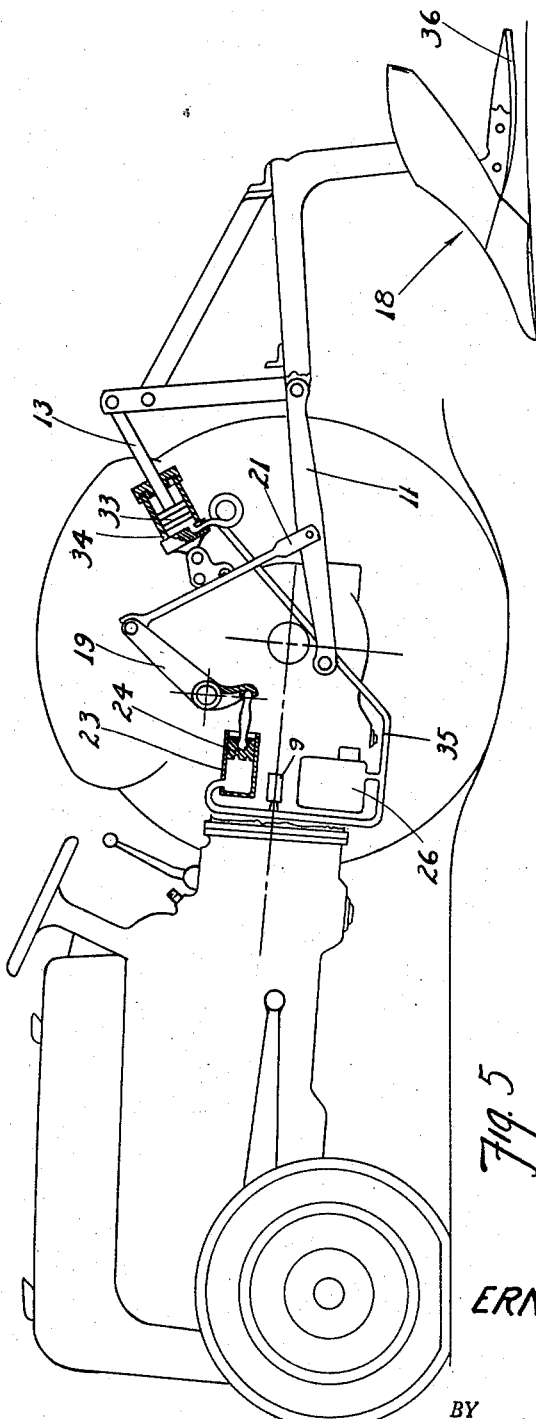

Dec. 7, 1948.  E. V. BUNTING  2,455,727
IMPLEMENT CONTROL MEANS FOR TRACTOR
MOUNTED AGRICULTURAL IMPLEMENTS
Filed Nov. 23, 1944  4 Sheets-Sheet 4

ERNEST V. BUNTING
INVENTOR.

BY
Barnes, Kisselle, Laughlin & Raisch
Attorneys

Patented Dec. 7, 1948

2,455,727

UNITED STATES PATENT OFFICE 2,455,727

IMPLEMENT CONTROL MEANS FOR TRACTOR MOUNTED AGRICULTURAL IMPLEMENTS

Ernest V. Bunting, Dearborn, Mich., assignor to Harry Ferguson, Inc., Dearborn, Mich., a corporation of Delaware Application November 23, 1944, Serial No. 564,778

8 Claims. (Cl. 97—50)

1

The invention relates to implement control means for tractor mounted implements and more particularly to tractors embodying improved implement depth control systems such, for example, as that known as the "Ferguson" system disclosed in Ferguson Patents Nos. 2,118,180 and 2,118,181, issued May 24, 1938.

Implement depth control systems in such tractors embody control means operated by power derived from the tractor as through a hydraulic pump and a cylinder and piston motor. The control means is, among other things, adapted to respond to variations in the draft of an implement to adjust the operative relation of the implement to the soil. Thus, the system, as shown in the aforesaid patents, is arranged to respond to variations in the draft of a plow resulting from an increase or decrease in the depth of the plow in the ground to lower or raise the plow whereby to maintain it at constant depth in the soil.

An object of the invention is to provide new and improved means for modifying the operation of the control system in its response to variations of implement draft, the action of the modifying means also being responsive to variations in implement draft.

Another object of the invention is to provide a new and improved implement depth controlled system which embodies a pressure fluid piston and cylinder motor, an associated control means for adjusting the vertical position of an implement, such as a plow, to maintain it at a predetermined depth in the soil, and a second hydraulic piston and cylinder device connected directly with the piston and cylinder motor and arranged to be subjected to the forces produced by implement draft.

Another object of the invention is to provide in a "Ferguson" system of implement depth control, means in the form of a piston and cylinder interposed in the upper compression link of the hitch and connected directly with the main lift cylinder of the implement depth control system for subjecting the pressure fluid in the main lift cylinder to the variations in forces occurring in the hitch linkages as a result of variations in the draft of the implement.

Other objects will become apparent in the following description and from the accompanying drawings, in which:

Fig. 1 is a fragmentary somewhat diagrammatic view partially in section of a tractor and implement depth control system embodying the features of the invention.

Figs. 2 and 3 are similar, but somewhat more fragmentary views illustrating the relationship between the piston and cylinder in the upper link

Figure 6:
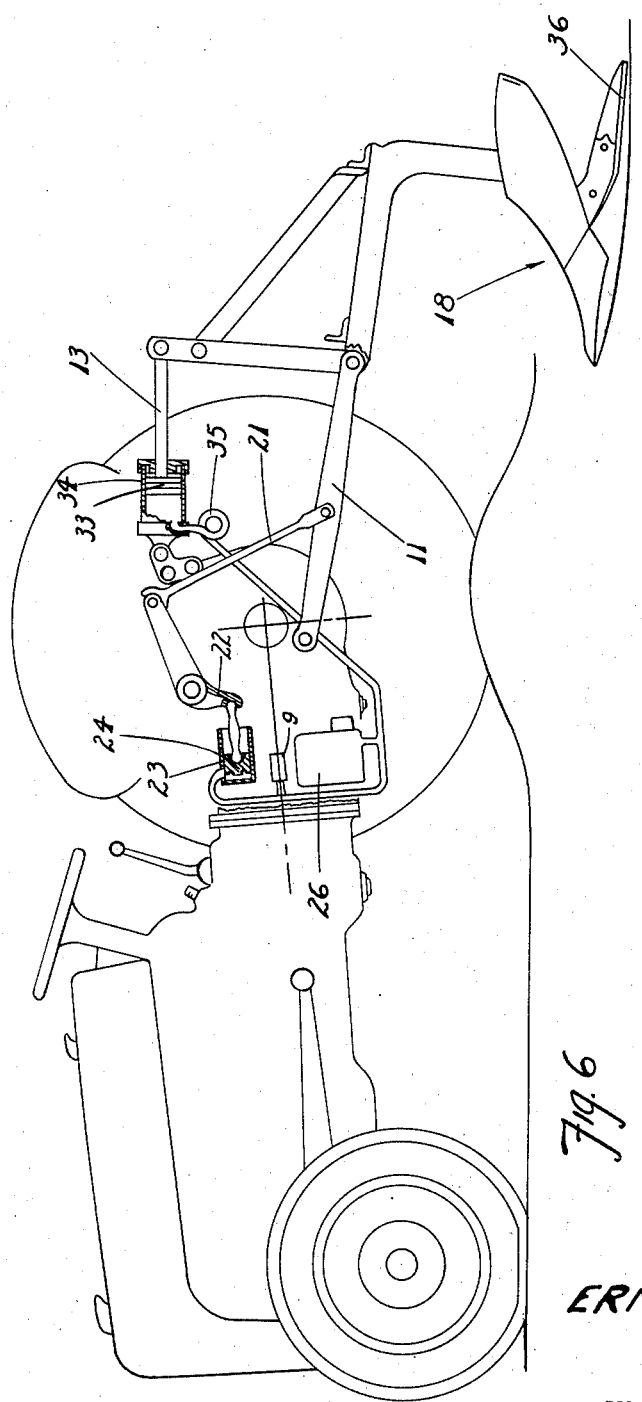

2 and the plow in different vertical positions of the latter.

Fig. 4 is a view similar to Fig. 1 illustrating a somewhat modified form of the invention.

Figs. 5 and 6 show respectively the response of the control system under operating conditions in which the tractor and plow relationships are such respectively as to increase or decrease the depth of the plow in the soil from predetermined depth.

While the invention is susceptible of various modifications and alternative constructions, I have shown in the drawings and will herein describe in detail certain preferred embodiments, but it is to be understood that I do not thereby intend to limit the invention to the specific forms disclosed, but intend to cover all modifications and alternative constructions falling within the spirit and scope of the invention as expressed in the appended claims.

The drawings herein, while somewhat diagrammatic, are in sufficient detail to disclose the novel manner in which a more responsive and complete control of the draft and depth of an implement may be had without alteration (except by addition) of the control means, shown in the aforesaid patents, through which the reaction of the horizontal resistance of the soil to the ground engaging parts is utilized to control the implement. Like the system shown in said patents the improved mechanism is constructed so that the downward vertical forces in the implement may be utilized as an added weight on the tractor to secure traction.

Referring to Figs. 5 and 6 of the drawings a tractor equipped with pneumatic tires and embodying the "Ferguson" system of implement control is shown as having a plow mounted thereon. The construction and operation of the "Ferguson" system is well known to those skilled in the art and it will not, therefore, be necessary to describe it in complete detail.

By way of a general résumé of the disclosure of the above mentioned patents, the differential housing 10 of the tractor has a pair of transversely spaced lower draft links 11 (see Fig. 1) universally pivoted thereto, as at 12, for principle movement in a vertical plane, about axes located below and in front of the axis of the rear axle. An upper compression link 13 is pivotally secured through a bell crank lever 14 to the differential housing 10 above and slightly to the rear of the tractor axle. The draft and compression links 11, 13 extend rearwardly from the tractor and together form the implement hitch. At their outer ends the links are arranged for connection respectively with upper and lower portions of a vertically extending part 15 of a plow frame 16 from which the beam 17 extends downwardly to support the plow base 18.

The draft links 11 are arranged to be moved vertically by power means comprising in this system a pair of lift arms 19 secured to the opposite ends of a rock shaft 20 extending transversely of the differential housing 10 and connected by links 21 with the draft links 11. Within the differential housing the rock shaft 20 carries a lever arm 22 through which the shaft is rocked to lift the arms by the hydraulic motor comprised of the cylinder 23 and piston 24, the piston and arm 22 being coupled by connecting rod 25. Pressure fluid is supplied to the lift cylinder from a pump 26, the flow of fluid to and from the cylinder being controlled by a valve 27. The valve is arranged selectively to open an intake passage permitting fluid to be drawn into the pump for delivery under pressure to the cylinder to lift the draft links 11 or to open an outlet or exhaust passage for the escape of fluid from the cylinder to lower the draft links 11 or to block both passages and close the system.

A valve control lever 28 is connected at one end with the valve 27 and is pivoted intermediate its ends on a yoke 29. A manual control lever arm 30 rocks a crank arranged to act on the other end of the lever 28 to shift the control valve in the manual control of the vertical movements of the draft links 11.

As set forth in the Ferguson Patent 2,118,180 included by reference above (e. g. Fig. 8 therein), the hydraulic system includes a loaded release valve which operates as a safety valve to release oil from the piston and cylinder 23, 24 only upon the pressure reaching a dangerously high level. Such overload release valve has been designated in the drawings by the numeral 9 and may be integrally included in the pump 26.

When the plow is in operation the horizontal resistance of the soil to the ground engaging part or plow base produces through reaction a compressive force in the upper or compression link 13 which will vary directly with variations in the implement draft. Such compression forces are utilized by the system to control the depth of the implement in the ground through a control rod 31 connected between the bell crank lever 14 and the yoke 29 and a balancing spring 32, which opposes the compressive forces tending to move the control rod 31 inwardly. The movements of the yoke 29 with the control rod 31 swing the valve control lever 28 about the point of engagement between the lever 28 and the actuating crank of the manual control lever 30 as a fulcrum. Since spring 32 is deflected in accordance with the compression force exerted thereagainst with a corresponding movement of the control rod and yoke, the valve control lever may be arranged by shifting its fulcrum (effected by the setting of the lever 30) to select any desired compression of the control or balancing spring as the point at which the valve will close and block the system. This determines the depth to which the plow may penetrate the ground by virtue of its suck and weight. The arrangement is such that a lessening of the compressive force in the link 13 through any change in the operation of the plow or its relation to the tractor will shift the valve to exhaust fluid from the cylinder 23 and allow the implement to go deeper into the soil. Conversely an increase of the compressive force due to any such change will shift the valve to admit pressure fluid to the cylinder 23 thereby raising the plow until the predetermined depth of cut is again reached.

In a system of this character and as thus far described, the normal traction of the tractor alone is increased by the transfer thereto of a downward vertical force primarily resulting from the weight and suck of the implement, the transfer for the most part being by hydraulic pressure in the lift cylinder. In this connection transfer of weight for traction purposes only will be considered, but it should be understood that other weight transfer which is of no particular importance to the present invention occurs in the system. If, under certain operating conditions hydraulic pressure in the lift cylinder is lost, the transfer of weight will be interrupted and a momentary loss of traction will occur until pressure is restored. Thus, a movement of the tractor and plow to the relationship shown in Fig. 5 may cause a part of the previously transferred weight of the implement to be then supported by the soil instead of the hydraulic system. Or should the implement for any reason suddenly be freed of the force exerted there against by the soil (as when the soil in front of the share breaks free in lumps) the suck of the implement may be lost or reduced. In either event the net result is the loss of the downward vertical force. Too much loss of traction may allow the tractor wheels to spin until the hydraulic system can operate to restore the condition of transferred weight to the tractor. Where the rear wheels of the tractor are equipped with pneumatic tires there is an added factor which amplifies the effect of the momentary loss of control. The weight transferred to the tractor causes a compression of the tires which of course is a force rapidly released to raise the rear end of the tractor when the transferred weight is lost. This may first tend to raise the implement, but the response of the system to this condition will open the control valve and drop the implement so that on continued forward movement of the tractor the implement will dig deeper. Hence when the full horizontal resistance is again encountered, usually suddenly, wheel spin will occur until sufficient fluid has been pumped into the lift cylinder to restore the transferred weight to the tractor and deflect the tires to their previous condition.

The primary disadvantage of loss of transferred weight is that a lapse of time may occur before sufficient liquid has been pumped into the lift cylinder to restore the system to a weight transferring condition, it being remembered that the initial reaction of the system to lowered compression in the upper link is to effect an exhaust of fluid from the lift cylinder.

To overcome this momentary loss of control, I have provided means which is directly subject to variations in the implement draft force for modifying the action of the control system. This is accomplished by making the transfer of weight directly dependent upon the horizontal resistance encountered by the implement without regard to its control solely through the admission or release of pressure fluid to or from the main lift cylinder. Thus, as shown in Fig. 1, the upper compression link 13 has interposed therein a piston and cylinder device which includes a piston 33 connected to a section of link 13 joined to the implement frame and a cylinder 34 connected to a section of the link joined to the bell crank lever 14. The cylinder 34 is connected by a conduit 35 with the closed end of the main lift cylinder 23 so that the piston 33 will move out of the cylinder 34 to extend the compression link 13 when pressure fluid is admitted to the main lift cylinder 23 to raise the implement.

Thus, when pressure fluid has been admitted to the main lift cylinder 23 to raise the implement to its transport position, pressure fluid will also have been admitted to the cylinder 34 (see Fig. 2) of the compression link to force the piston therein outwardly and fully extend the upper link. The implement will, therefore, be transported as rigidly as though the upper link were actually solid. It is to be observed that the extension of the top link just described, and which takes place when the implement is raised to transport position, results in a rearward tilt or canting of the implement as it begins to rise, thus aiding in quickly freeing it of the ground.

In Fig. 3, the implement is shown as having penetrated the soil to approximately its desired working depth. Since the control valve 27 has been opened by movement of the manual control lever 30 to permit escape of fluid from the main lift cylinder 23 thereby lowering the implement, the initial engagement between the plow and the soil has caused the plow frame in effect to topple forward and expel all of the fluid in the upper link cylinder. The upper link, therefore, is shortened and the angle of penetration of the plow into the soil is increased to insure that the plow will quickly reach its desired working depth. In other words, the implement is toppled forward into what may be termed a quick-penetration position.

As the plow reaches the depth predetermined by the setting of the control lever 30, the compressive force in the upper link 13 acting against the opposing force of the spring 32 will shift the valve lever 28 to block fluid escape and stop the downward movement of the plow. During this operation, however, the variation of compressive forces in the upper link will have caused successive momentary openings of the valve to admit pressure fluid to the lift and upper link cylinders. In this control admission of pressure fluid will extend the lift cylinder piston to check the downward movement of the implement and extend the upper link piston to tip the plow rearwardly about a heel slide 36 (Fig. 1) or the like on the plow and lessen the angle of plow penetration. The balance will occur when both pistons are partially extended with the transferred weight from the implement supported primarily by the fluid in the lift cylinder and with the plow running level at its predetermined depth with part of the weight carried by the heel slide to insure that the implement will go deeper when the system acts to effect such a change.

It will be apparent that the condition of balance with both pistons partly extended may be achieved with a given arrangement of linkage (e. g. that shown in Fig. 1) merely by selecting a piston and cylinder 33, 34 having an area ratio with respect to the main piston and cylinder which is in an intermediate range readily ascertained by one skilled in the art. It is obvious that using a piston 33 which is many times smaller than illustrated will produce a hydraulic top link capable of exerting but a limited force resisting soil reaction, causing the top link to exist predominantly in a collapsed or bottoming condition. On the other hand, choosing a top link piston many times larger than that in the system shown will cause the top link to exist predominantly in the fully expanded condition. An intermediate diameter results in the desirable operation outlined herein with the piston 33 movable in either direction.

Under actual field conditions it is observed that the auxiliary piston 33 moves a small amount backward and forward in the central part of its range almost continuously and there is no apparent tendency for the piston to go "all the way" once it departs from a central position. This condition of stability can be more readily appreciated by first assuming that the implement is being drawn along in the ground on an even keel and at a certain depth. When a hole is encountered (see Fig. 5) the resultant upward jackknifing of the draft links 11 causes withdrawal of the main piston 24. The increased volume is thereupon immediately filled with oil from the top link cylinder, with the piston 33 therein moving forward to some new position. The piston 33 does not remain in such forward position, however, (even ignoring the difference in angling of the implement in the ground) since the tractor will immediately proceed out of the hole and over an adjacent hump. The latter movement (see Fig. 6) causes a reverse or downward swing of the links, compression of the main piston 24, and flowage of the displaced oil into the top link cylinder. This causes rearward movement of the top link piston. Thus it is seen that there is constant "give and take" of oil, with movement of the top link piston taking place in each direction about its assumed central position.

Stability can be further demonstrated from another viewpoint when it is noted that the top link is, of itself, capable of corrective tilting of the implement to compensate for changes in draft. Even in the absence of the main piston and cylinder, it is obvious that an increase in draft reacting on the control valve would cause flow of oil from the pump expanding the top link and tilting the implement upwardly, while a decrease in draft would cause the oil to exhaust and thus effect tilting of the implement downwardly until an equilibruim draft force is achieved. In the actual apparatus both cylinders are operative and, being stable when acting alone, they are stable in combination. That the differential of the piston areas is not particularly critical may be still further apprehended when it is considered that the force to be overcome in the auxiliary cylinder is less than the force to be overcome by the main lift cylinder, which latter must work against and support the overhanging weight of the implement. Thus, if the auxiliary cylinder and piston should be compressed for any reason it will always return to an intermediate position whenever the incoming fluid from the pump acts upon it with sufficient force to move it from its forward position against the force resulting from horizontal draft resistance.

In such a control system there is no tendency of the hydraulic system to lose control of the transfer of weight for tractive purposes. With reference to Figures 5 and 6 the effect of irregularity in the soil surface upon the relationship of the tractor and implement is shown. In Figure 5 the relationship is that assumed when the rear tires drop suddenly into a depression. The loss of pressure in the hydraulic system instead of resulting in complete loss of control of the transferred weight, causes the fluid in the top link cylinder to flow into the lift cylinder. The fluid in the system accordingly remains under pressure. Lag in the system is avoided and there is accordingly no loss of control of the transferred weight. Moreover, the flow of fluid from the top link cylinder to the lift cylinder permits the plow to change its angle of penetration, the change in this instance (Fig. 5) being to increase the angle, allowing the plow to go deeper and thereby tending to maintain the plow at its predetermined depth of cut through the depression.

Figure 6 shows the relationship of the tractor and implement resulting when the tractor passes over a bump raising the rear wheels. In this instance, the elevation of the rear wheels of the tractor, instead of lifting or tending to lift the implement bodily vertically simply causes the fluid to flow from the lift cylinder to the top link cylinder. While in this relationship of the tractor and implement there will be no loss of control of transferred weight, the present system has the advantage of tipping the implement backwardly on its heel slide so that it will run shallower.

Should horizontal resistance on the implement suddenly be relieved, as by the breaking away of the soil, the implement will not be raised by the expansion of the tractor tires permitted by the loss of transferred weight, but will tip backward accompanied by a flow of fluid from the lift to the upper link cylinders. Full control over the transfer of weight to the tractor is maintained so that should the tractor, after being suddenly relieved of transferred weight, have a heavy draft force imposed thereon when the plow base reaches the unbroken soil, the restoration of the transferred weight will be immediate.

As an incident to the flow of fluid from one cylinder to the other the accompanying forward or backward tipping movement of the plow base momentarily alters the angle of penetration thereof. This tends to alter the running depth of the implement in the soil gradually rather than abruptly. Therefore, since the system goes into immediate operation upon any change in reaction the depth of the implement will not have been appreciably changed before the system has acted to return the plow base to its proper running depth.

The modified construction illustrated in Fig. 4 has the same modifying effect on the system as in the arrangement just described. In the modification, however, the main lift cylinder 23a has in addition to the main lift piston 24 a second piston 37 which is connected through a rod 38 with one end of the lever 39 pivoted on a rock shaft 40. The lift cylinder 23a is supplied through conduit 35a with fluid from pump 26. The lower draft links 11 are in this instance pivoted as at 41 to the opposite end of the lever 39. The upper compression link 13 is a straight member. In this form variations in the draft force act through the draft links 11, lever 39 and piston 37 to modify the action of the pressure fluid on the main lift cylinder. The result is the same as where the compressive forces are applied to the pressure fluid through a top link cylinder. By way of comparison of the arrangement shown in Figs. 1 and 4, it is to be observed that in each case provision is made for altering the effective length of one of the hitch linkages. Thus, in Fig. 1, the top link is lengthened or shortened by the operation of the piston and cylinder unit 33, 34, whereas, in Fig. 4, the auxiliary piston 37 serves to cause the elements 11, 39 to scissor toward and away from each other, thereby altering the effective length of the lower linkage 11, 39. In both instances a rocking of the implement in a fore and aft direction is accomplished by changing the effective length of one of the hitch linkages.

What I claim is:

1. The combination of a tractor having a piston and cylinder type hydraulic lift motor thereon, means for supplying pressure fluid to said cylinder to effect a relative axial displacement of said piston and cylinder, compression and draft links trailingly pivoted in vertically spaced relation from the rear end portion of the tractor, means for detachably connecting an implement to the rear ends of said links to apply a forward reaction thrust to said compression link in proportion to the draft load imposed on the implement, control means for varying the volume of fluid in said cylinder automatically in response to variations in the thrust on said compression link, means for suspending said draft links from said lift motor for vertical movement thereby, and means associated with said links including an auxiliary piston and cylinder having free pressure communication with said main piston and cylinder, said auxiliary piston and cylinder being so constructed and arranged as to enable piston movement to either side of some intermediate position during the course of normal use.

2. In a tractor for connection with agricultural implements, the combination of upper and lower draft linkages trailingly pivoted on the rear end portion of the tractor at vertically spaced pivot points, one of said linkages being variable in length under the influence of stress applied thereto as an incident to draft load, means for pivotally attaching the trailing ends of said draft linkages to vertically spaced points on said implement for effecting rocking of the implement fore and aft as an incident to change in length of said variable linkage, depth control means including a hydraulic motor on the tractor for automatically raising and lowering said draft linkages in response to variations in implement draft, safety valve means for limiting the maximum hydraulic pressure available at said motor, said variable length linkage including a hydraulic device, said hydraulic device being arranged to resist change in length of said variable linkage under stress applied thereto as an incident to draft load, and means including a hydraulic connection between said hydraulic device and said hydraulic motor which is unobstructed to allow movement of said hydraulic device to both sides of a mid-position to effect give and take of hydraulic fluid at all pressures below said limiting pressure.

3. In a tractor for connection with agricultural implements, the combination of upper and lower hitch links trailingly pivoted at vertically spaced points on the rear end portion of the tractor and having means at their trailing ends for pivotal attachment at vertically spaced points to an implement, a hydraulic lift motor on the tractor connected to said links for swinging the same vertically, a control device disposed to be shifted in response to change in stress in one of said links for causing said hydraulic motor to lift or lower said links correctively to retain the implement draft load substantially uniform, and means including an hydraulic piston and cylinder in one of said links and in constant pressure communication with said motor for varying the effective length of the link in response to draft-produced changes in stress therein, said piston having an area such that it has an intermediate position with respect to the cylinder and is movable in either direction therefrom under pressure changes to cant the implement in a fore and aft direction to correct for the change in draft.

4. For use on a tractor having a vertically-swingable power-operated draft linkage on its rear end portion and including a hydraulic motor for operating the same and of the type in which an increase and decrease in hydraulic pressure from an intermediate value due to variations in ground reaction causes respective raising and lowering of said linkage, the combination comprising a ground working implement adapted to penetrate the ground as it moves forward, means including a hydraulic piston and cylinder interposed in said linkage, said cylinder being continually in free fluid communication with said motor so that lowering of said link from an elevated transport position to a lowered working position causes collapsing movement of said piston and consequent forward toppling movement of the implement into a quick-penetration position, the buildup of pressure due to ground reaction being effective to increase the hydraulic pressure and thus restore said piston to an intermediate position, the piston being of such area that increase in pressure above said equilibrium value corresponding to excessive ground reaction produces expanding movement of the piston from its intermediate position and canting of said implement rearwardly for quick run-out of the same from the ground.

5. In a hitch for supporting a ground working implement wholly from a tractive vehicle excepting only such support as is afforded by the ground when the implement is in operation and which ground working implement is characterized by having a leading ground penetrating portion and a following rearwardly located portion for ground engagement to provide a point of pivotal support for the implement on the ground as the penetrating portion moves vertically between its maximum and minimum ground penetrating positions, the combination therewith of upper hitch means and lower hitch means arranged for connection with a tractive vehicle, said upper hitch means being connectable with said vehicle for transmitting thereto forces reacting from the operation of the implement in the ground, said lower hitch means being connectable with said vehicle for transmitting to the implement forces resulting from the movement of the vehicle, length-adjusting means including a piston and cylinder for effecting a relative change in the effective length of said upper hitch means and said lower hitch means, said length-adjusting means having an intermediate running position and an extreme position on either side thereof, and means including a control valve responsive to changes in the forces acting on said hitch means for varying said length-adjusting means to one side or the other of its intermediate running position for the corrective tilting of said leading ground penetrating portion of the implement about said point of pivotal support.

6. In a tractor mounted agricultural implement for working the soil, an implement depth control having the combination with vertically swingable draft and compression links for mounting the implement on the tractor, a cylinder having a piston connected to raise said links when pressure fluid is admitted to said cylinder, a control system responsive to variations in implement draft for admitting or releasing fluid to or from said cylinder to maintain the implement at a constant working depth and an over-pressure relief valve for setting an upper limit of pressure applied to said motor, of a second cylinder and piston interposed in said compression link acting in a direction to increase the length of said link upon the admission of pressure fluid to said second cylinder, and a conduit connecting said cylinders for free interchange of fluid therebetween, said second piston having an area such that it reciprocates in both directions about an intermediate position during normal operation of the implement below said upper limit of pressure.

7. An implement depth control for a tractor mounted agricultural implement for working the soil having in combination with vertically swingable draft and compression links for mounting the implement on the tractor, a hydraulic motor for moving said links vertically, and a control system responsive to variations in implement draft reacting as compression forces in said compression link for actuating said motor to maintain the implement at a substantially constant depth in the soil, of a hydraulic displacement device interposed in said compression link, said hydraulic displacement device having a constantly effective fluid connection with said motor for subjecting said motor to variations in compression forces in said link and movable to either one side or the other of a mean position as a result of the passage of the tractor wheels over bumps and hollows respectively encountered during normal use, the passage of fluid resulting from the relative movement of the tractor and implement serving to compensate the hydraulic motor and to minimize the effect of said bumps and hollows on the elevation of said implement in the ground.

8. An implement control for a tractor mounted agricultural implement having the combination with vertically swingable draft and compression links for mounting the implement on the tractor, of a control system for maintaining the implement in the soil, including a lift cylinder having a piston operably connected with said links to raise them when pressure fluid is admitted to the cylinder and a second cylinder having a piston movable to extend the length of the compression link when pressure fluid is admitted to the second cylinder, said cylinders being hydraulically interconnected to maintain both pistons constantly under the same hydraulic pressure regardless of the relative movements of the tractor and implement occurring during a soil working operation, said pistons having relative diameters such that they both tend to assume mean equilibrium positions corresponding to normal running operation and are movable to either side of said intermediate positions in response to unbalance in the pressures respectively applied thereto.

ERNEST V. BUNTING.

REFERENCES CITED

The following references are of record in the file of this patent:

UNITED STATES PATENTS

| Number | Name | Date |
| --- | --- | --- |
| 2,352,276 | Lindgren | June 27, 1944 |
| 2,356,231 | Ferguson | Aug. 22, 1944 |
| 2,394,210 | Sherman | Feb. 5, 1946 |
| 2,405,980 | Sands et al. | Aug. 20, 1946 |

FOREIGN PATENTS

| Number | Country | Date |
| --- | --- | --- |
| 253,566 | Great Britain | June 14, 1926 |